(12) United States Patent
Silverberg (10) Patent No.: US 6,216,110 B1
(45) Date of Patent: Apr. 10, 2001

(54) SYSTEM AND METHOD FOR PUBLISHING CALENDAR INFORMATION TO A PUBLICLY ACCESSIBLE LOCATION

(75) Inventor: Steven Mark Silverberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/031,851

(22) Filed: Feb. 27, 1998

(51) Int. Cl.$^7$ .................................................. G06F 17/60
(52) U.S. Cl. ........................................ 705/9; 705/7; 705/8
(58) Field of Search .................................. 705/8, 9, 7, 28, 705/29; 345/156, 112, 340; 700/36, 100–102

(56) References Cited

U.S. PATENT DOCUMENTS

| | | | |
|---|---|---|---|
| 4,626,836 | * 12/1986 | Curtis et al. | 345/156 |
| 4,648,023 | * 3/1987 | Powell | 705/29 |
| 4,751,635 | * 6/1988 | Kret | 707/10 |
| 5,016,170 | * 5/1991 | Pollalis et al. | 705/7 |
| 5,050,077 | * 9/1991 | Vincent | 705/8 |
| 5,197,000 | * 3/1993 | Vincent | 705/8 |
| 5,311,423 | * 5/1994 | Clark | 705/8 |
| 5,594,638 | * 1/1997 | Iliff | 705/3 |
| 5,892,904 | * 4/1999 | Atkinson et al. | 713/201 |

FOREIGN PATENT DOCUMENTS

29814843 * 8/1998 (EP) ............................ G06F/17/60

OTHER PUBLICATIONS

Fersko–Weiss, "Timeline" a software for project management, from PC Magazine vol. 6, n16, on p. 199(3), Sep. 1987.*
David Noller of Purdue University, "Programgives best choices for scheduling meetings", from the column "Mini–Micro Computers" of Gary E. Whitehouse, P.E., 6 pgs. in IE magazine, Jan. 1984.*
Panwalkar et al., "A survey of scheduling rules", from Operations Research, vol. 25, No. 1, pp. 45–60, Sep. 1987.*
Jacknabbit.com, "Inforspace partner to extent instant scheduling to millions of merchants", published by Appointime.com http://www.jacknabbit.com, pp. 1–2, May 2000.*

(List continued on next page.)

Primary Examiner—James P. Trammell
Assistant Examiner—Cuong H. Nguyen
(74) Attorney, Agent, or Firm—Kilpatrick Stockton LLP (57) ABSTRACT

Publishing to a publicly-accessible wide area network an availability file containing information on an individual's availability to attend a proposed meeting. A user input, indicating the occurrence of an event, is accepted. Availability information is parsed out of the user input and published to an availability file located on a file server connected to a publicly accessible wide area network. The availability file is maintained in a commonly-recognized file format. Others can access the availability file over the publicly-accessible wide area network to ascertain the user's availability to participate in a proposed event, such as attendance of a proposed meeting. These parties, however, do not have access to the user's details of the occurrence of the event.

14 Claims, 4 Drawing Sheets

OTHER PUBLICATIONS

Jacknabbit.com, "First real–time, online scheduler debuts at Internet world", published by Appoint.com http://www.jacknabbit.com, pp. 1–2, Apr. 2000.*

"Jacknabbit.com leaps to life as first real–time, online scheduler", published by Appointime.com http://www.jacknabbit.com, pp. 1–3, Feb. 2000.*

"Jacknabbit.com delivers first real–time, online scheduling service", published by Appointime.com http://www.jacknabbit.com, pp. 1–2, Dec. 1999.*

Noller, D. "Program gives best choices for scheduling meetings", Industrial Engineering, vol. 16, No. 1, Jan. 1984.*

Zhao et al., "Scheduling tasks with resource requirements in hard real–time systems", IEEE Trans. on Software Engineering, vol. SE–31, No. 5, New York, pp. 564–576, May 1987.*

Sprunt et al., "Aperiodic Task Scheduling for hard real–time systems", Real Time Systems, vol. 1, No. 1, pp. 27–60, Jun. 1989.*

Ramanritham et al., "Scheduling algorithms and operating systems support for real–time systems", Proc. of the IEEE, vol. 82, No. 1, New York, pp. 55–67, Jan. 1994.*

* cited by examiner

SYSTEM AND METHOD FOR PUBLISHING CALENDAR INFORMATION TO A PUBLICLY ACCESSIBLE LOCATION

FIELD OF THE INVENTION

The present invention generally relates to computerized calendar programs. More particularly, the present invention relates to providing public access to availability information associated with an individual's computerized calendar via a distributed computer network.

BACKGROUND OF THE INVENTION

In today's technological environment, people often keep calendars on their computers in order to maintain their schedules. In a cooperative electronic environment represented by a distributed computer network, where computers can communicate with each other, calendar programs allow users to electronically query each others' schedules. Accordingly, an individual user of a calendar program in a group of users can pick a time at which to plan a meeting which does not conflict with the schedules of proposed attendees. The individual user can direct a computer to query a computer file (or files) maintained by the calendar program. The computer file contains, among other things, availability information including the times of the day that each of the proposed attendees using the calendar program are either free or busy (the "free/busy information"). In this manner, the individual user is presented with the times of day that each of the proposed attendees can or cannot attend the meeting. This feature allows the individual user to pre-select an appropriate day and time to plan the meeting so that the largest number of proposed attendees can attend.

Several problems face existing calendar programs. One problem is the closed-environment nature of the existing calendar programs. A user of an existing calendar program only has access to the availability information of the other users of the existing calendar program. This limitation creates a problem if the user wishes to invite a non-user of the existing calendar program to attend the meeting. The user does not have access to the schedule of the non-user, even if the non-user maintains an electronic calendar, albeit on a different calendar program.

Most existing calendar programs maintain the availability information for each of the users in a single file having a proprietary format such that non-users cannot easily access it. The reason is three fold: (1) it makes locating and accessing the information easier for the calendar program, (2) individuals generally do not want to allow public access to their personal or business calendars, and (3) calendar programs typically have a proprietary data format and access infrastructure. For security reasons, it makes sense not to allow anyone outside of the users of the particular calendar program to have access to the schedules of the users. On the other hand, often is the case that a user will desire to plan a meeting and to invite a non-user.

Accordingly, a need exists for a system which allows both users and non-users of a calendar program to have access to the availability information associated with the schedules of each of the users, while not allowing non-users access to the actual calendars of the users.

SUMMARY OF THE INVENTION

The present invention meets the above described needs by providing the availability information of a user of a calendar program to the public by creating an availability file containing the availability information for that user in a known format, and making the availability file accessible to the public. Non-users of the calendar program can access the availability file of the user, thereby allowing them access to the user's availability information to help maximize the number of proposed attendees that can attend a planned meeting.

One aspect of the present invention allows a user of a calendar program to keep a personal or business calendar on a computer. The calendar program can allow the user to maintain a schedule file containing all of the user's calendar information separate from other users of the calendar program. Alternatively, the schedule file can be a merged file common to all of the users of the calendar program and containing the calendars of all users. The calendar program also creates and maintains an availability file that contains only the availability information of a particular user. Each availability file is typically unique to a particular user. The availability file is created in a known format such that other calendar programs can open the file and understand the information it contains.

The availability file is made available to the public so that non-users of the calendar program can access the user's availability information. One method for making the availability file accessible to the public is by publishing the availability file to a publicly accessible location, such as a File Transfer Protocol ("FTP") server on the Internet. The location to publish the availability file may be stored in a registry file available to the calendar program. In the exemplary embodiment, the calendar program makes use of known communication protocols, such as FTP or HyperText Transfer Protocol ("HTTP"), to publish the availability file of the user to the publicly accessible location. In this manner, non-users of the calendar program can access the publicly-accessible availability information of the user, without gaining access to the user's complete personal or business calendars.

In another aspect, the present invention allows a user of a calendar program to plan a meeting by compiling a list of proposed attendees and querying publicly accessible availability files associated with each of the proposed attendees. Each of the availability files contains the availability information of its associated proposed attendee. The calendar program presents that availability information to the user in a fashion which allows the user to plan a time for a meeting that is more likely to maximize the number of proposed attendees that can attend.

More particularly, a calendar program can accept a first input representing a request to plan a meeting. Responsive to the first input, the user is presented with an input screen which accepts a second input representing an identifier associated with a proposed attendee. The identifier can be the name of the proposed attendee, an alias for the proposed attendee, an e-mail address for the proposed attendee, or some other mechanism to uniquely identify the proposed attendee. The calendar program queries a registry file to determine the location of an availability file associated with the proposed attendee.

The registry file indicates to the calendar program how the proposed attendee's availability file can be found. For instance, the registry file may indicate to the calendar program that an address for the availability file is contained in a "vCard" file associated with the proposed attendee. If so, then the calendar program will read the vCard file to ascertain the address. Alternatively, the registry file can define a standard scheme for identifying the address of the availability file. For instance, the registry file may indicate that the address takes the form "ftp://yourserver/freebusy/%alias%.vcs," and the calendar program may insert the identifier in place of the "%alias%." The address can be an Internet address, such as a Uniform Resource Locator ("URL") associated with the proposed attendee, or any other identifier of a publicly accessible location of the availability file.

Once it has ascertained the address of the availability file, the calendar program accesses the availability file, via a pre-determined communication protocol, such as FTP or HTTP, and retrieves the availability information associated with the proposed attendee. The calendar program is able to access and retrieve the information from the availability file because the availability file is created and maintained in a known format in a publicly accessible location. In this manner, the availability file can be accessed by any calendar program that is configured to read the availability file, and which is capable of communicating by the pre-determined communication protocol.

Once it has retrieved the availability information for the proposed attendee, the calendar program can present that information to the user in a graphical manner, thereby allowing the user to select an appropriate time at which to plan the meeting. As is known in the art, the user may then continue to plan the meeting by sending a request to attend the meeting to the proposed attendee indicating the appropriate time. Accordingly, the present invention provides a "store-and-forward" technique for providing availability information relating to each of the proposed attendees at a publicly accessible location or locations, thereby facilitating the planning of a meeting.

Other objects, features, and advantages of the present invention will become apparent upon reading the following detailed description of exemplary embodiments, taken in conjunction with the drawings and the claims.

DETAILED DESCRIPTION OF THE EMBODIMENTS

The present invention is directed to providing public access to availability information associated with an individual's computerized calendar to facilitate planning a meeting without compromising the details of the individual's computerized calendar. For the purpose of this discussion, the availability information is also termed the free/busy information. In one embodiment, the invention is incorporated in a calendar application program entitled "OUTLOOK 98", marketed by Microsoft Corporation of Redmond, Wash. Briefly described, the program allows a user to electronically maintain his or her personal or business calendar and intelligently plan a meeting by querying other users' personal or business calendar to determine an appropriate time for the meeting.

Figure 1:
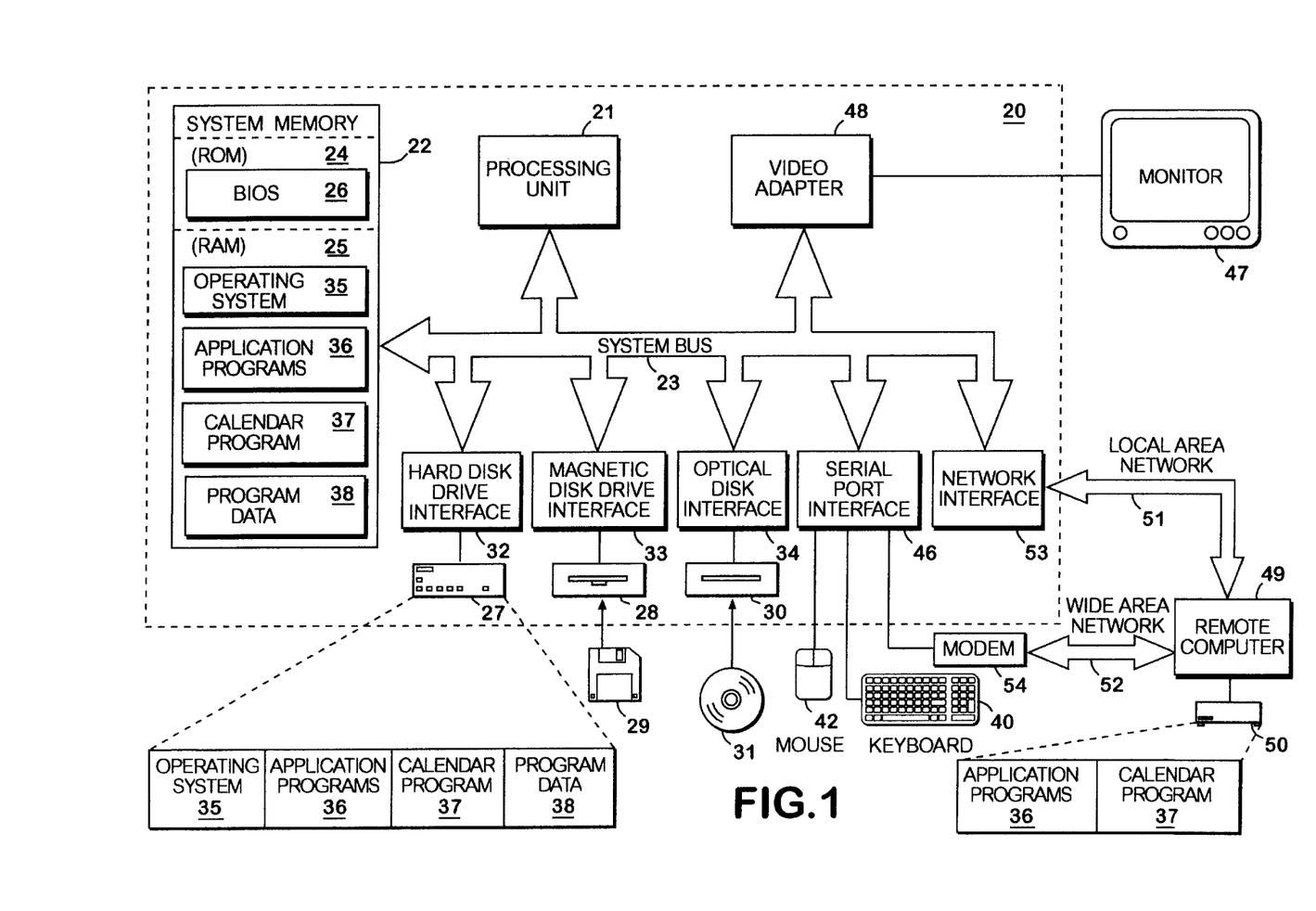
FIG. 1 is a block diagram of a computer that provides a portion of the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (RO) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules, such as a calendar program 37 in accordance with an exemplary embodiment of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
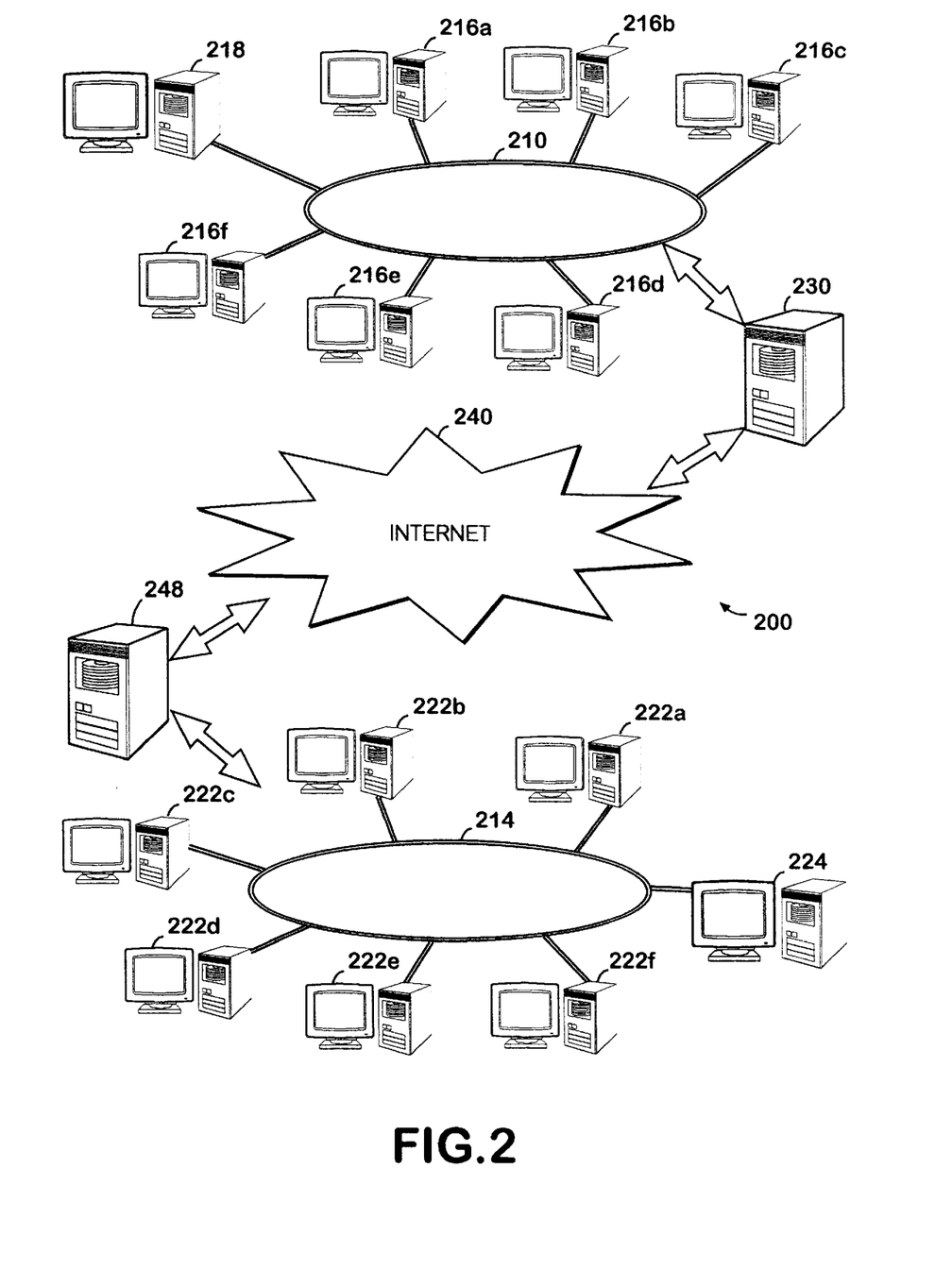
FIG. 2 is a block diagram of a networking environment which supports an exemplary embodiment of the present invention.

FIG. 2 is a block diagram of a networking environment which supports the exemplary embodiment of the present invention. The networking environment 200 includes a first local area network (the "first LAN") 210 and a second local area network (the "second LAN") 214. The first LAN 210 and the second LAN 214 can be any industry standard networking topology, such as token ring, ethernet, etc. Personal computers 216a–f, such as a computer 218 are connected to the first LAN 214. Running on the computer 218 is a calendar program designed in accordance with an exemplary embodiment of the present invention such as the calendar program 37 (FIG. 1). The calendar program allows a user to input and maintain scheduling information, such as the times of day the user will be attending an appointment, the times of day the user will be out of the office or the like. The calendar program is a network-aware, stand-alone calendar program. In other words, the scheduling information for the user is stored on the computer 218 itself, and the users of the other computers 216a–f on the first LAN 210, which are also using the calendar program, have direct access to the stored scheduling information on the computer 218.

A server 230 is also connected to the first LAN 210. The server 230 can be a file server or other server available to the personal computers 216a–f and the computer 218. The server 230 can also be a router or gateway to a large publicly accessible wide area network, such as the Internet 240. The server 230 can act as a conduit between the computer 218 and the Internet 240. The server 230 can also act as an FTP server to make certain files stored on it available to others accessing the Internet 240.

Similarly, personal computers 222a–f, such as a computer 224, are connected to the second LAN 214. Connected to the second LAN 214 is a server 248, which can be a file server, an applications server or the like. The server 248 can also be a gateway to the Internet 240 or an FTP server, making files stored on the server available to users of the Internet 240. Running on the second server 248 is a second calendar program, also designed in accordance with an exemplary embodiment of the present invention. The second calendar program is a server-based calendar program which allows the users of the second LAN 214 to access and maintain their schedules, which are all stored on the server 248.

In operation, a user (the "first user") maintains a schedule on the first computer 218 using the calendar program. The file associated with the first user's schedule (the "schedule file") is kept on the computer 218. For another computer on the first LAN 210, such as the computer 216a, to query the schedule file, the computer 216a can use the computer's file system to read the schedule file over the first LAN 210. Because each of the computers 216 on the first LAN 210 use the same calendar program, the file format of the schedule file is known to each computer 216. Moreover, it is likely that the first user does not have reservations about the other users of the first LAN 210 accessing the first user's schedule file, as opposed to only the availability information.

In addition to the schedule file on the computer 218, the calendar program also creates and maintains an availability file on the server 230 which mirrors the availability information in the schedule file associated with the first user. As mentioned above, the availability information can include the days and times-of-day that the first user has commitments, such as meetings, appointments, or is out of the office. The availability file does not, however, mirror the details of the commitments in the schedule file, such as the attendees, the nature of meetings or the like. In this way, the availability file discloses when the first user has commitments, yet does not disclose the details of the commitments.

The calendar program compiles the availability information for the first user and writes that information to the availability file on the server 230. In the exemplary embodiment, the calendar program may write to the server 230 over the first LAN 210 using FTP for file transfers. FTP is well known to those skilled in the art for transferring files over the Internet. Consequently, when the calendar program writes to the availability file at the FTP server 230, the availability information for the first user is accessible to anyone having access to the Internet 240.

A user of the second computer (the "second user") can plan a meeting and invite the first user by use of the networking environment 200. To do so, the second user makes use of the calendar program at the server 248 to generate a request for the availability information of the first user. Although discussed in general here, this transaction is discussed in more detail below with respect to FIG. 3. Using the FTP protocol, the second server 248 accesses the availability file at the server 230 over the Internet 240. Those skilled in the art will understand that accessing the server 230 can include logging onto the server 230 by providing a login name and password. In this manner, the second calendar program has available the availability information of the first user and can present it to the second user in some usable fashion, such as a graphical display or textual. Based on the availability information of the first user, the second user can plan a meeting with added confidence that the first user will be available to attend. At this point, the second user can continue planning the meeting by issuing an invitation to the first user to attend, such as with an e-mail message, by telephone or personal contact. The calendar program on the computer 224 can automate these tasks as well, once the initial scheduling conflicts have been eliminated through the use of the availability file.

In brief, FIG. 2 illustrates a system whereby the first user can maintain a personal schedule with details stored in a schedule file on the computer 218. The computer program on the computer 218 parses the schedule file and publishes the first user's availability information to an availability file stored on the server 230, an Internet-accessible FTP server. Then, when prompted, another calendar program, running on the server 248, can query the server 230 over the Internet 240, using FTP, for the availability file. Finally, the availability information within the availability file is presented to the second user in a fashion which allows the second user to intelligently plan the meeting.

Figure 3:
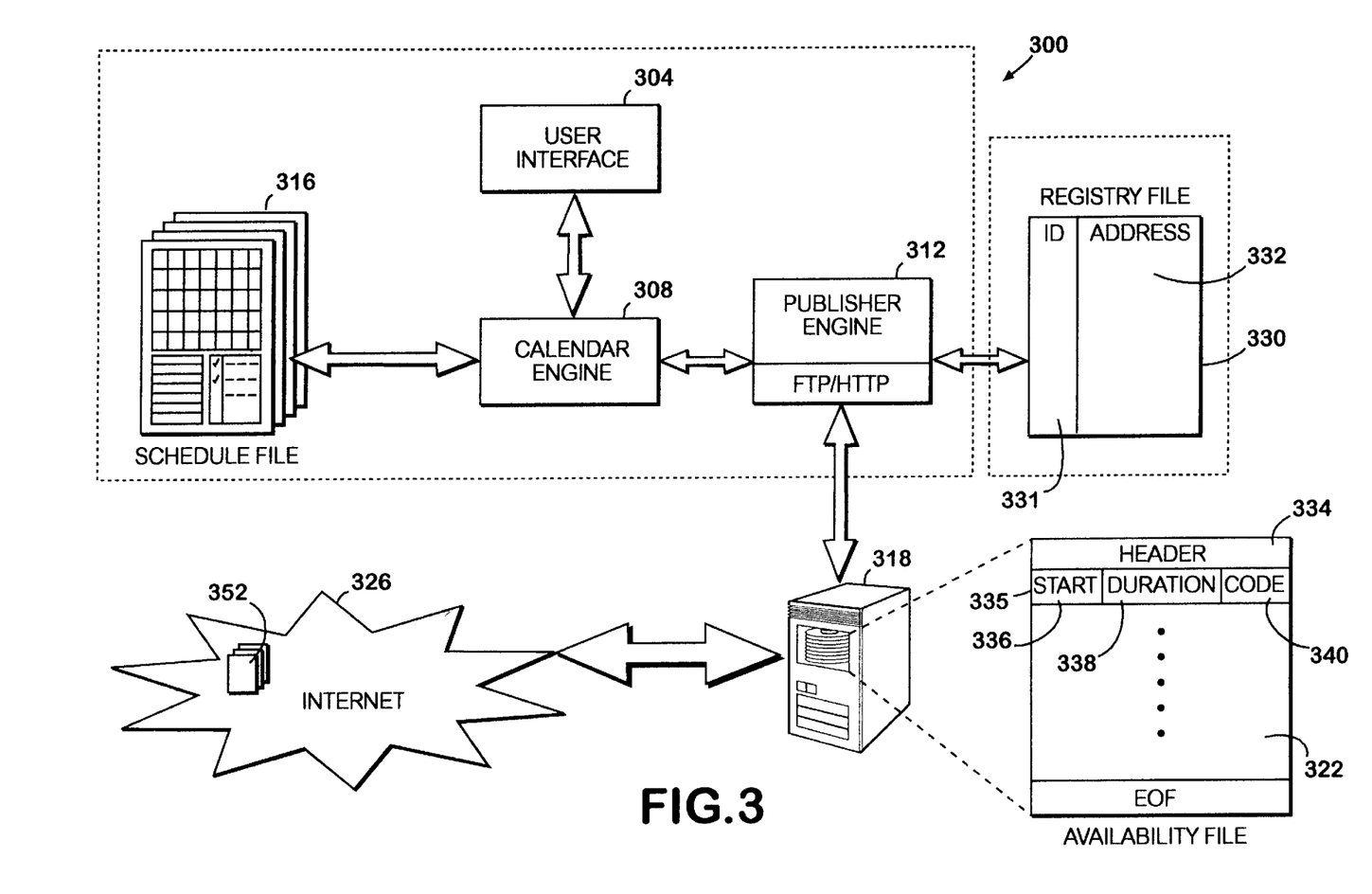
FIG. 3 is a functional block diagram of the software modules embodying a calendar program in accordance with an exemplary embodiment of the present invention.

FIG. 3 is a functional block diagram of the software modules of a calendar program 300 constructed in accordance with an exemplary embodiment of the present invention. The calendar program 300 includes three major software modules: a user interface 304, a calendar engine 308, and a publisher engine 312. Each of these modules is discussed in further detail below.

The user interface 304 is a software module that allows a user to interact with the calendar program 300, such as to input schedule information. The user interface 304 also allows the calendar program 300 to present schedule information to the user. The user interface 304 can be a graphical windows interface or a textual interface.

The calendar engine 308 receives user input from and presents user output to the user interface 304. For the purpose of this discussion, the calendar engine 308 is a software module that performs all necessary tasks to create and maintain the computerized schedule for the user, such as generating schedule conflict information, performing file system tasks, and the like. The calendar engine 308 creates and maintains a schedule file 316, which is stored on a hard disk or other permanent storage medium at the host computer. Alternatively, the schedule file 316 can be accessed over a network on a file server, such as on file server 318. The calendar engine 308 stores the entire user input in the schedule file 316. The calendar engine 308 also parses the availability information from the user input and forwards that information to the publisher engine 312. In the exemplary embodiment, the availability information can be a start time and date for an appointment, the duration of the appointment, and a code representing the tentativeness of the appointment.

The schedule file 316 includes scheduling information input by the user, such as an event input including the times and dates of appointments, meeting or the like. The schedule file 316 can also contain detailed information about the scheduling information, such as the nature and venue of appointments, who will attend the appointments and the like. The schedule file 316 likely contains much information that the user does not wish to share with the general public. Accordingly, the schedule file 316 is not accessible by the general public. The schedule file 316 may, however, be accessible by the users of a local area network to which the host computer is connected. If the user desires to share the schedule file 316 over a local area network, other users of the calendar program 300 may have access to the schedule file 316 over the local area network. These users can access the schedule file 316 by using either the host computer file system or a special proprietary file management system employed by the calendar program 300.

The file server 318 can be a computer housing a large permanent storage medium and serving the clients of the local area network by providing a common location for the clients, such as the user, to store data, such as the schedule file 316 or an availability file 322. The file server 318 can also be a gateway for providing the clients of the network with access to a publicly accessible wide area network, such as the Internet 326. The file server 318 includes suitable communications software and hardware to connect to the publicly accessible network, via an ISDN link or other acceptable telecommunications or hard-wired data link.

The file server 318 can also include FTP daemon software to allow the file server 318 to function as an FTP server with the ability to make files accessible over the Internet 326. Alternatively, the file server 318 can include HTTP server software which would also allow certain files stored on the file server 318 to be shared over the Internet 326. However, those skilled in the art will appreciate that the HTTP protocol is less efficient than the FTP protocol. The FTP and HTTP file transmission protocols are used as illustrative examples only, and any acceptable file transmission protocol can be used.

The publisher engine 312 is a software module that creates and maintains the availability file 322 associated with the user of the calendar program 300, and queries the availability files of others. The publisher engine 312 can publish the availability file 322 to a publicly accessible location identified in a registry file 330 (discussed in greater detail below). One example of such a publicly accessible location is on the file server 318. Publishing the availability file 322 can occur at particular time intervals or whenever a change is made to the schedule file 316. The publisher engine 312 can also include file-format conversion mechanisms, decoding mechanisms or other mechanisms for facilitating the maintenance of the availability file 322. The publisher engine 312 performs the FTP or HTTP file transfers to the file server 318 by making use of a complement of application programming interfaces ("APIs") or dynamic link libraries ("DLLs") which support the FTP or HTTP protocols. File transfer using the FTP and HTTP file transfer protocols is known in the art.

In addition to identifying the location to publish the availability file 322, the registry file 330 can define a schema for retrieving an availability file related to a potential attendee. For instance, the registry file 330 can direct the publisher engine 312 to a "vCard" file (not shown) related to a potential attendee. The vCard file can include business-card type information for the potential attendee as well as an address (discussed below) for the availability file related to the potential attendee. For example an entry for the potential attendee in the registry file 330 may take the following form:

READURL: HTTP://MYSERVER/FREEBUSY/ %name%.vfb

The registry file 330 can also be a portion of a system registry maintained by the operating system of the host computer, or a directory service maintained on the host computer. However, for simplicity of discussion the registry file 330 of the exemplary embodiment contains a listing of identifiers 331 for each potential attendee that the user may invite to a meeting and an address 332 associated with each potential attendee. The identifier 331 can be a nickname, a proper name, or any other unique identifier which allows the calendar program to uniquely identify each potential attendee. The address 332 can be an Internet address, a URL, or other address which points to the availability file associated with a particular potential attendee maintained on the publicly accessible network, such as the Internet 326. The registry file 330 can be configured by the calendar program 300 to include any individual which the user may choose, with an address 332 for that individual. Alternatively, the registry file 330 can include a location of a vCard file containing the address 332 for that individual.

In operation, the user interface 304 receives an event input concerning an appointment, such as a business lunch at a particular time. The event input can include a value indicating the tentativeness of the appointment, or the likelihood that the appointment will actually occur. For instance, the event input can identify whether the appointment will certainly happen, is likely to happen, or may not happen. The user interface 304 presents the event input to the calendar engine 308, which stores the event input in the schedule file 316. The event input data associated with the appointment is represented in the schedule file 316. The calendar engine 308 parses from the event input the date and start time of the appointment, the duration of the appointment, and the tentativeness value. These three pieces of information (the availability information) are forwarded to the publisher engine 312 for inclusion in the availability file 322.

Depending upon its configuration, the publisher engine 312 can either immediately publish the availability information, or queue the availability information for publication at a pre-determined time or at a pre-determined time interval. In the exemplary embodiment, the publisher engine 312 immediately publishes availability information for each event input. Consequently, the publisher engine 312, via the FTP or HTTP DLLs and APIs, publishes the availability information to the availability file 322 at the file server 318.

An illustrative file format for the availability file 322 is illustrated in FIG. 3. The availability file 322 can include a file header 334, a series of records 335, and an end-of-file field 342. The file header 334 can contain information relating to the user and to the availability information itself, such as the number of days, weeks or months covered by the availability file 322 and the like. Each record 335 in the availability file 322 represents a single appointment and includes a start time field 336, a duration field 338, and a code field 340. The start time field 336 reflects the starting time and date of the appointment. The duration field 338 is the length of time that the appointment will last. The code field 340 is the tentativeness value associated with the appointment. For instance, a code of 1 could indicate that the user will absolutely attend the appointment, while a code of 3 could indicate that the event is merely tentative and the user may not attend the appointment. The availability file 322 can be stored in an easily-readable data format, such as an ASCII text file or other commonly readable data format.

In brief, once the user provides the calendar program 300 with an event input representing an appointment, the calendar program 300 stores the event input in the schedule file 316. The calendar program 300 also writes the availability information associated with the event input to the availability file 322 residing on the file server 318. Once the availability information has been written to the availability file 322, the availability information is available to any individual with FTP or HTTP access to the file server 318 over the Internet 326.

In the exemplary embodiment, the user can plan a meeting by issuing a request to the calendar program 300 to do so, via the user interface 304. The calendar engine 308 directs the user interface 304 to prompt the user for the proposed attendees of the meeting. In response to the receipt of a proposed attendee, the calendar engine 308 passes the proposed attendee to the publisher engine 312. The publisher engine 312 queries the registry file 330 to identify the proposed attendee. The publisher engine 312 compares the proposed attendee to the list of identifiers 331 in the registry file 330. If the publisher engine 312 identifies a match, the address 332 associated with the identified proposed attendee is selected.

The publisher engine 312 then initiates a file access of a remote availability file 352 associated with the identified proposed attendee at the selected address. The remote availability file 352 is created and maintained by a second calendar program, but also made available over the Internet 326. The publisher engine 312 accesses the remote availability file 352 over the Internet 326, making use of the FTP or HTTP APIs and DLLs and the file server 318. Once the remote availability file 352 is located, the availability information contained therein is read by the publisher engine 312. The remote availability file 352 is stored in the same common data and file formats as the availability file 322 discussed above. In this manner, separate calendar programs which otherwise maintain their data files in proprietary or closed formats can still exchange availability information without compromising the privacy of the detailed schedule information.

The publisher engine 312 then passes the availability information from the remote availability file 352 to the calendar engine 308 to be presented to the user interface 304. The user interface 304 can present that information to the user in any usable format, such as a graphical display of the proposed attendee's unavailable times. The graphical display can also reflect the tentativeness of the proposed attendee's unavailable times, such as textually or through color coding. In this manner, the user can intelligently select a time and date for a proposed meeting which is likely to comport with the proposed attendee's schedule.

Figure 4:
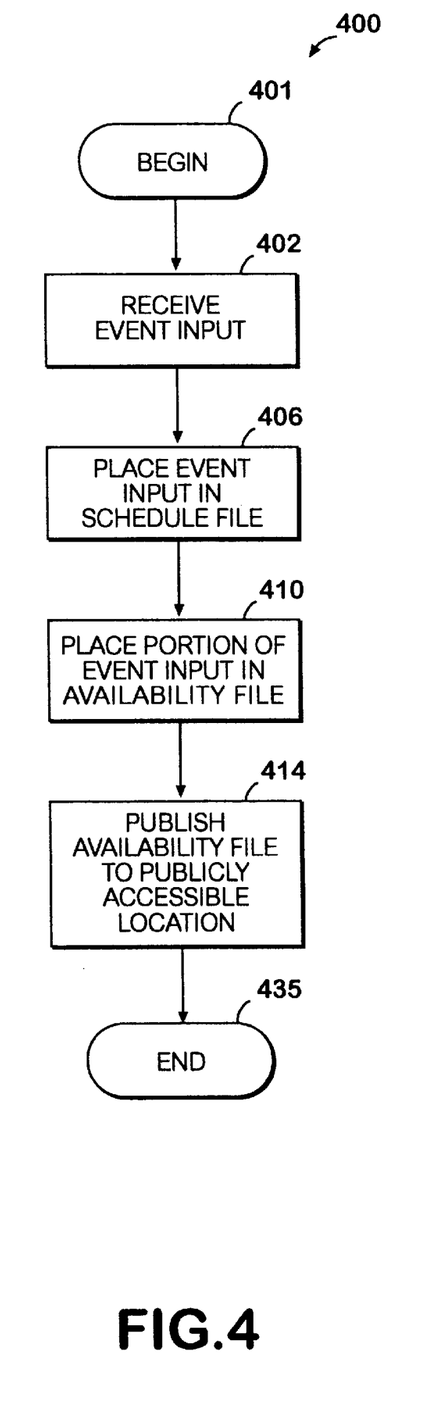
FIG. 4 is a flow chart illustrating the steps involved with creating and maintaining an availability file in accordance with an exemplary embodiment of the present invention.

FIG. 4 is a flow chart illustrating the steps for creating and maintaining an availability file in accordance with an exemplary embodiment of the present invention. The flow chart 400 enters at the beginning block 401 where a calendar program awaits an event input. At block 402, the calendar program has received the event input concerning an appointment which the user intends to observe. The appointment can be a business meeting, a personal lunch, or any other engagement or commitment of the user's time. The event input can include the time, date, duration, a tentativeness value and other details of the appointment.

At block 406, the event input is placed in a schedule file. The schedule file can be a computer file associated with the calendar program which maintains a detailed record of all of the user's appointments. The schedule file can be stored at location local to the calendar program or remotely from the calendar program. Although the schedule file may be accessible by other users of the calendar program over a local area network, the schedule file is not stored in a location which is accessible to the public at large.

At block 410, a portion of the event input is placed in an availability file. The portion of the event input which allows a reader to determine what dates and times of day the user is available to attend a meeting is written to the availability file. The event input may also include a code which identifies the tentativeness of the user to participate in the appointment, which may also be included in the availability file. The availability file is maintained in a common format which allows other calendar programs to access and read the availability file.

At block 414, the availability file is published to a publicly accessible location. For instance, the availability file can be published to an FTP or HTTP server accessible over a publicly accessible wide area network, such as the Internet. The availability file can be published at pre-determined times, at pre-determined intervals, or in response to a particular stimulus, such as the input of an appointment. The flow chart 400 then returns to the idle state, awaiting further input, at ending block 435. In this manner, the flow chart 400 illustrates a manner of making a user's availability information available to the general public in a common format, while not compromising the privacy of the details of the user's appointments.

Figure 5:
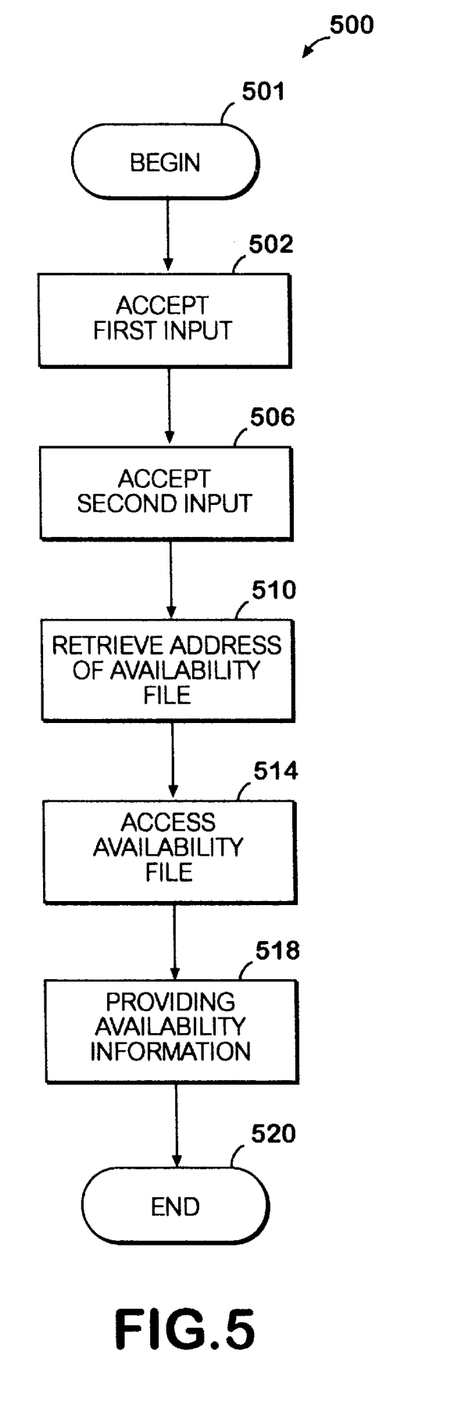
FIG. 5 is a flow chart illustrating the steps involved with planning a meeting through the use of an availability file in accordance with an exemplary embodiment of the present invention.

FIG. 5 is a flow chart 500 illustrating the steps involved with planning a meeting through the use of a publicly accessible availability file in accordance with an exemplary embodiment of the present invention. The flow chart 500 enters at beginning step 501 where a calendar program awaits input. At block 502, the calendar program accepts a first input. The first input can be an instruction to the calendar program to plan a meeting. In response to the instruction to plan a meeting, the calendar program initiates a routine to identify an appropriate time to schedule the meeting. The routine can include presenting a graphical interface to allow the user to input proposed attendees for the meeting and to select an appropriate time to schedule the meeting.

At block 506, a second input is received. The second input can be a proposed attendee for the meeting. The second input can take the form of the proposed attendee's name, a nickname associated with the proposed attendee or any other unique identifier associated with the proposed attendee.

At block 510, based on the second input, an address associated with the proposed attendee is retrieved. The address can be stored in a registry file or look-up table containing addresses for multiple potential attendees. The registry file can be a single standalone computer file, a series of entries in a global registry file, a directory service, or any other acceptable medium for storing addresses associated with potential attendees. The address can identify a publicly accessible location of an availability file. The availability file can contain availability information, such as free/busy information, for the proposed attendee. The availability file can include the dates and times of day that the proposed attendee has committed to attend an appointment. Also, the availability file can contain a code associated with each appointment indicating the likelihood that the proposed attendee will attend the appointment.

At block 514, the availability file is accessed at the address over a publicly-accessible wide area network, such as the Internet. Accessing the availability file can include making use of the Internet's FTP or HTTP file transmission protocols, as well as other communication mechanisms as necessary to communicate over the publicly-accessible wide area network. Those skilled in the art will appreciate that communicating over the publicly-accessible wide area network, such as the Internet, can include securing a communications link, such as an ISDN or other telecommunications link to an Internet router or service provider. Communicating over the publicly-accessible wide area network can also include providing communications software and hardware, such as an Internet gateway, accessible by the calendar program and capable of supporting an appropriate communications protocol, such as TCP/IP. By accessing the availability file, the availability information for the proposed attendee is made available to the calendar program. Accordingly, the calendar program can interpret the availability information associated with the proposed attendee to determine the dates and times of day that the proposed attendee will be unavailable to attend the planned meeting.

At block 518, the availability information is presented to the user in such a manner as to give the user an interpretation of the availability of the proposed attendee to attend the meeting being scheduled. For instance, the calendar program can prepare a graphical day-planner display, in GANTT chart format, with the unavailable times of day darkened. In addition, color coding can be used to distinguish between those appointments which the proposed attendee certainly will attend and those which are more tentative, based on the tentativeness code mentioned above. Alternatively, the availability information can be presented to the user in textual format as a readout of the dates and times of day that the proposed attendee is unavailable for the meeting being planned. Based on the availability information, the user can select a time at which to schedule the meeting which does not conflict with the proposed attendee's schedule.

Finally, the calendar returns to the idle state awaiting further input at ending block 520. The further input can be a request to issue an invitation to the proposed attendee to attend the scheduled meeting. The request can take the form of an e-mail negotiation, either automated or manual, or other form of invitation to the proposed attendee to attend the scheduled meeting.

It will be appreciated from the above that the present invention provides access to the availability information of a user of a calendar program to non-users of the calendar program while disallowing the non-users access to the scheduling information of the user. More particularly, the present invention can generate a separate availability file for each user of a calendar program, the availability file containing only the availability information for its associated user. The availability file is preferably maintained in a common format which can be read by non-users of the calendar program that otherwise would not have access to the availability information of the user of the first calendar program. From a reading of the description above pertaining to the disclosed embodiment of the present invention, modifications and variations thereto may become apparent to those skilled in the art. Therefore, the scope of the present invention is to be limited only by the following appended claims.

What is claimed is:

1. A computer readable medium having computer-executable instructions for making availability information associated with a schedule file accessible to others without giving access to the schedule file, comprising:

receiving, at a first calendar engine module, a first event input indicating the occurrence of an event for a user of the calendar engine module, the first event input comprising a start time for the first event, a duration for the first event, and a tentativeness identifier for the first event;

in response to receiving the first event input, instructing the calendar engine module to place the first event input in the schedule file, wherein the schedule file is maintained on a local machine that is not publicly accessible;

instructing the calendar engine module to parse the first event input for availability information comprising the start time for the first event, the duration of the first event, and the tentativeness identifier for the first event;

from the calendar engine module, forwarding the availability information to a publisher engine module;

in response to receiving the availability information, instructing the publisher engine module to create an availability file comprising the availability information; wherein the availability file is stored in a non-proprietary format;

instructing the publisher engine module to publish the availability file to a server machine which is publicly accessible; and scheduling, at a second calendar engine module, a second event by accessing the availability file to determine the tentativeness identifier and, based on the tentativeness identifier, determining whether the user is likely to be available to attend the second event.

2. The computer readable medium of claim 1, wherein the step of placing the first event input in the schedule file further comprises writing contents of the event input to the schedule file and maintaining the schedule file on a permanent storage medium separate from the server machine.

3. The computer readable medium of claim 1, wherein the non-proprietary format is American Standard Code for Information Interchange ("ASCII") text format.

4. The computer readable medium of claim 1, wherein the availability file comprises a plurality of records, each record containing the start time, the duration, and the tentativeness identifier of a different event input.

5. The computer readable medium of claim 1, wherein the step of publishing the availability file comprises transmitting the availability file to the server machine connected to a publicly-accessible wide area network.

6. The computer readable medium of claim 5, wherein the availability file is published to the server machine using a file transmission protocol selected from a group including a File Transfer Protocol ("FTP") and a HyperText Transfer Protocol ("HTTP").

7. The computer readable medium of claim 6, wherein the server machine comprises a permanent storage medium separate from the local machine.

8. A computer readable medium having computer-executable instructions for planning a meeting having a proposed attendee, comprising:

accepting, at a calendar engine module, a first input indicating a request to plan the meeting;

accepting, at the calendar engine module, a second input that identifies the proposed attendee;

in a background thread, retrieving an address indicating a publicly accessible location of an availability file containing availability information associated with the proposed attendee, the availability information comprising a start time for an event of the attendee, a duration for the event of the attendee, and a tentativeness identifier for the event of the attendee and the availability file being in a non-proprietary format;

accessing, at a publisher engine module, the availability file at the publicly accessible location to retrieve the availability information associated with the proposed attendee;

providing, at the calendar engine module, the availability information associated with the proposed attendee in a form that enables planning the meeting at a time when the proposed attendee does not have a scheduling conflict; and scheduling, at the calendar engine module, the meeting by accessing the availability file to determine the tentativeness identifier and, based on the tentativeness identifier, determining whether the user is likely to be available to attend the second event.

9. The computer readable medium of claim 8, wherein the step of retrieving the address further comprises accessing a registry file containing a plurality of records, wherein one of the plurality of records comprises a first identifier corresponding to the proposed attendee and a second identifier corresponding to the address.

10. The computer readable medium of claim 8, wherein the publicly accessible location of the availability file comprises a file server connected to a publicly-accessible wide area network.

11. The computer readable medium of claim 8, wherein accessing the availability file is performed using a file transmission protocol selected from a group including a File Transfer Protocol ("FTP") and a HyperText Transfer Protocol ("HTTP").

12. A computer-readable medium having computer executable modules, comprising:

a user interface module operative for receiving an event input defining an event, the event input comprising a start time for the event, a duration of the event, and a tentativeness identifier for the event;

a calendar engine module operative to parse the start time, the duration, and the tentativeness identifier in response to receiving the event input from the user interface module, write the event input to a schedule file maintained at a location which is not publicly accessible, and transmit the start time, the duration, and the tentativeness identifier;

a publisher engine module, responsive to the start time, the duration, and the tentativeness identifier transmitted by the calendar engine module, operative to write the start time, the duration, and the tentativeness identifier to an availability file maintained at a first publicly accessible location to make the start time, the duration, and the tentativeness identifier publicly accessible; and the publisher engine module further operative to access a remote file located at a second publicly accessible location over a publicly accessible wide area network containing the start time, the duration, and the tentativeness identifier and to access the availability file to determine the tentativeness identifier and, based on the tentativeness identifier, determining whether the user is likely to be available to attend a meeting.

13. The computer-readable medium of claim 12, wherein the availability file further comprises a header containing data representing an individual associated with the availability file and the number of days for which the availability file is valid.

14. The computer-readable medium of claim 13, wherein the start time comprises the date on which the event will occur.

* * * * *